United States Patent [19]

Dörner et al.

[11] Patent Number: 5,768,978
[45] Date of Patent: Jun. 23, 1998

[54] FOOD PROCESSOR COMPRISING A MIXING VESSEL AND A DRIVE MECHANISM FOR AN AGITATOR IN THE MIXING VESSEL

[75] Inventors: Stefan Dörner; Volker Schmitz, both of Solingen, Germany

[73] Assignee: Vorwerk & Co. Interholding GmbH, Wuppertal, Germany

[21] Appl. No.: 737,374

[22] PCT Filed: Apr. 28, 1995

[86] PCT No.: PCT/EP95/01633

§ 371 Date: Jan. 27, 1997

§ 102(e) Date: Jan. 27, 1997

[87] PCT Pub. No.: WO95/29616

PCT Pub. Date: Nov. 9, 1995

[30] Foreign Application Priority Data

Apr. 28, 1994 [DE] Germany ............................ 44 14 821.6

[51] Int. Cl.[6] .............................. A21B 1/00; A47J 29/00; A47J 43/04; A47J 43/07

[52] U.S. Cl. .............................. 99/348; 99/510; 366/144; 366/146; 366/314; 366/601

[58] Field of Search ..................... 366/144–146, 366/314, 601; 99/337, 338, 348, 509, 468, 510, 511; 241/23, 65, 92, 282.1, 37.5

[56] References Cited

U.S. PATENT DOCUMENTS

| | | | |
|---|---|---|---|
| 4,779,522 | 10/1988 | Wong | 99/348 |
| 5,013,158 | 5/1991 | Tarlow | 366/251 |
| 5,031,518 | 7/1991 | Bordes | 99/338 |
| 5,228,381 | 7/1993 | Virgilio et al. | 99/331 |
| 5,363,746 | 11/1994 | Gordon | 99/328 |
| 5,605,090 | 2/1997 | Mantani et al. | 366/146 X |

FOREIGN PATENT DOCUMENTS

| | | |
|---|---|---|
| 0350380 | 1/1990 | European Pat. Off. . |
| 0491324 | 6/1992 | European Pat. Off. . |
| 1314227 | 1/1963 | France . |
| 2631535 | 11/1989 | France . |
| 3308780 | 9/1984 | Germany . |
| 3507276 | 9/1986 | Germany . |
| 634659 | 3/1950 | United Kingdom . |

*Primary Examiner*—Timothy F. Simone
*Attorney, Agent, or Firm*—Martin A. Farber

[57] ABSTRACT

A food processor with an agitator within a mixing vessel includes a drive mechanism for driving the agitator. Heat is applied to a lower region of the vessel during a holding of the vessel in a narrowly enclosing seat having a cylindrical wall region encircling a part of the vessel exclusive of a gap in the wall. An adjustment device enables enlargement and contraction of the wall region to facilitate emplacement and removal of the vessel with respect to the seat.

24 Claims, 13 Drawing Sheets

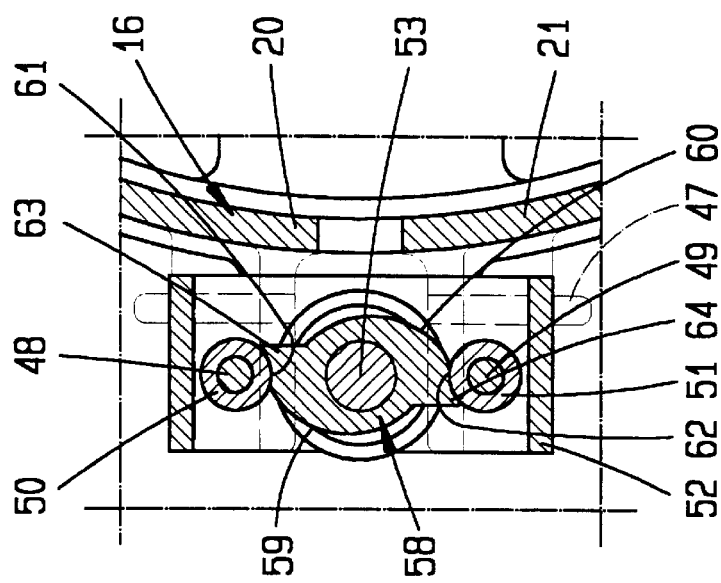
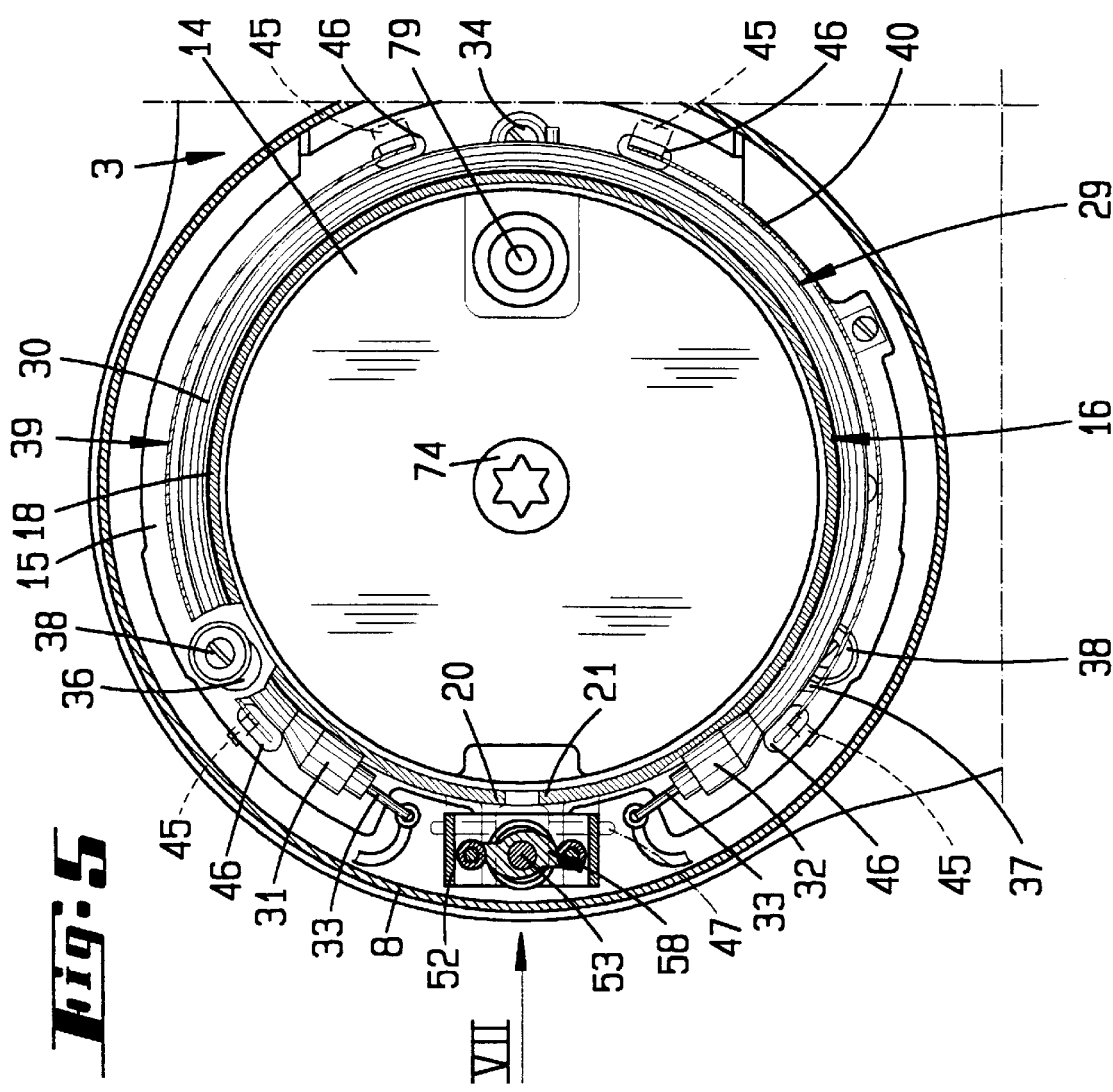

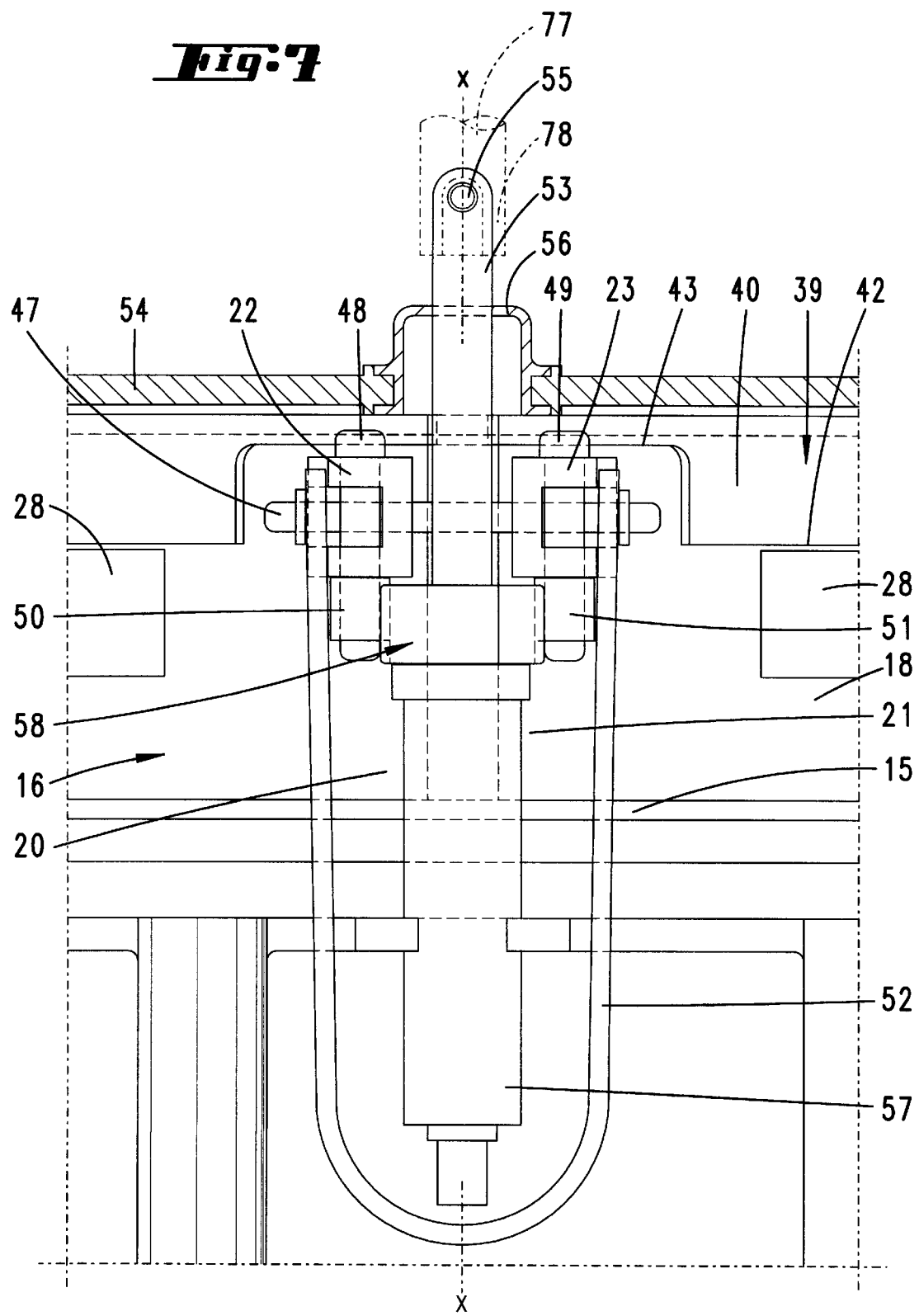

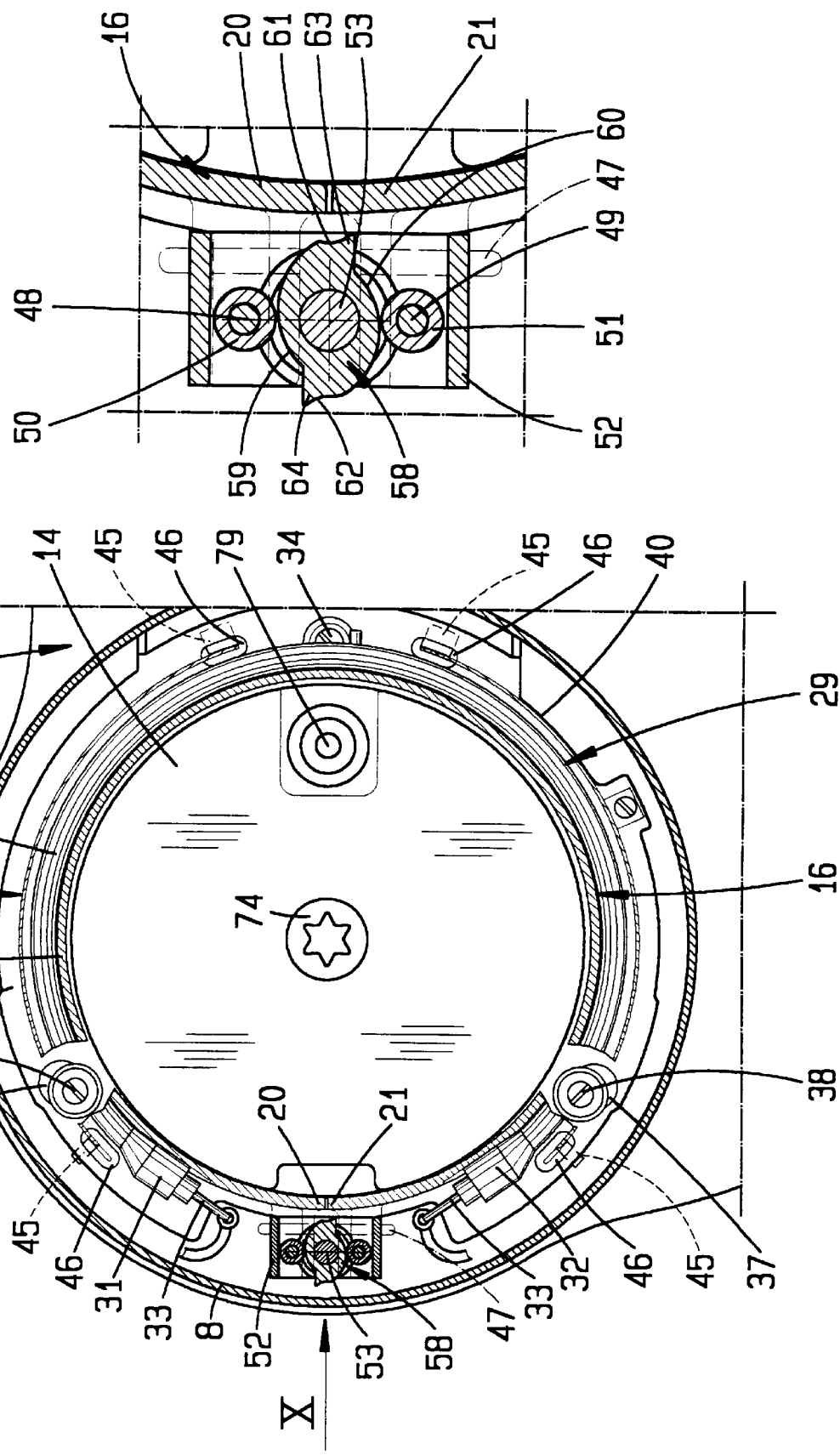

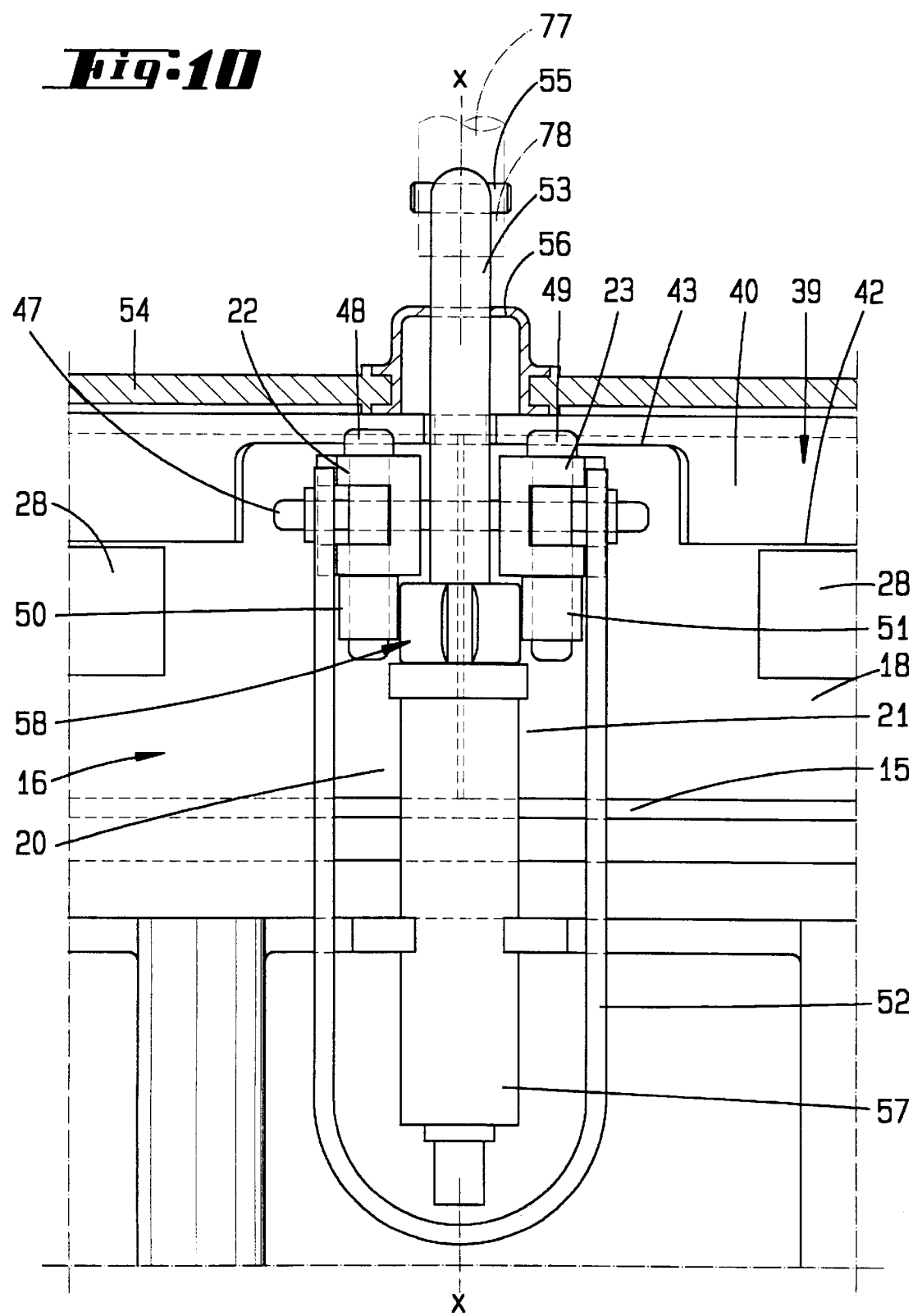

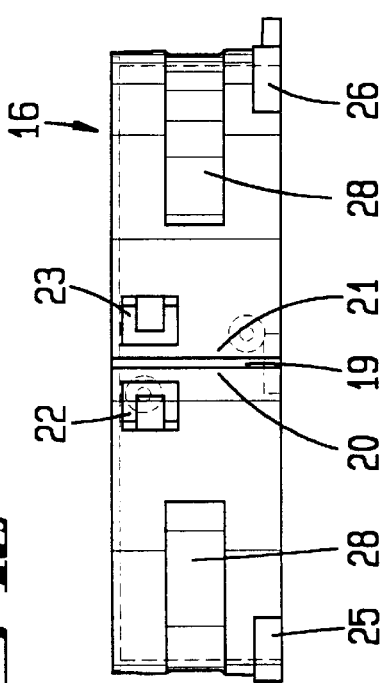
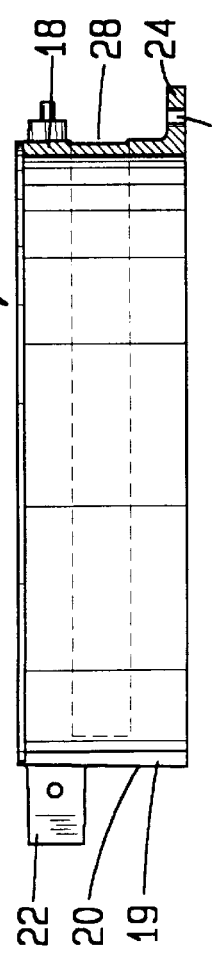
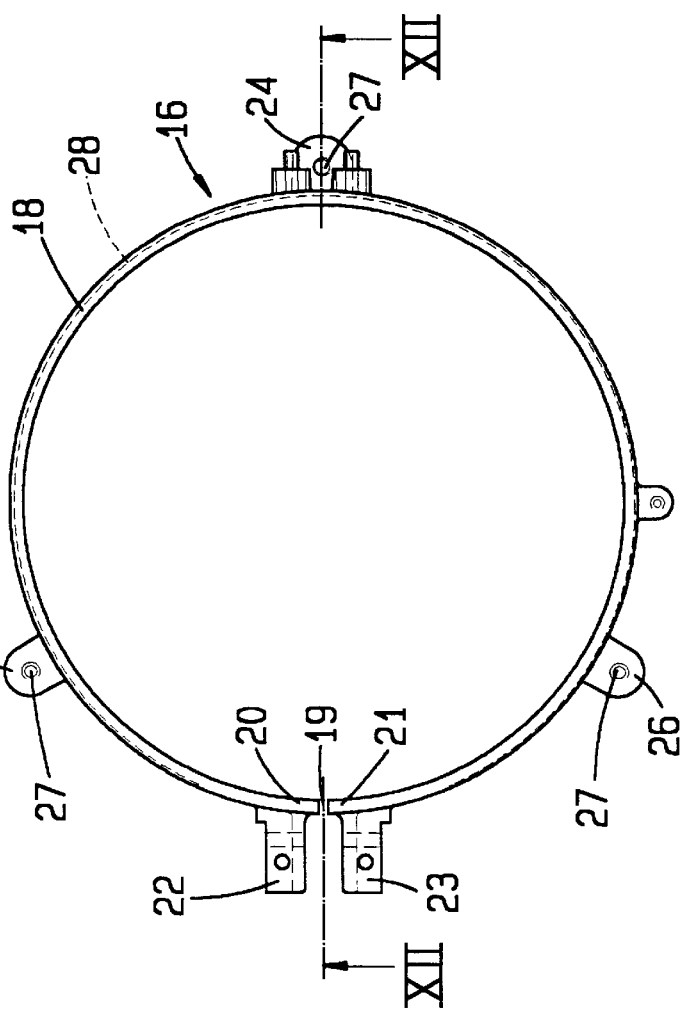

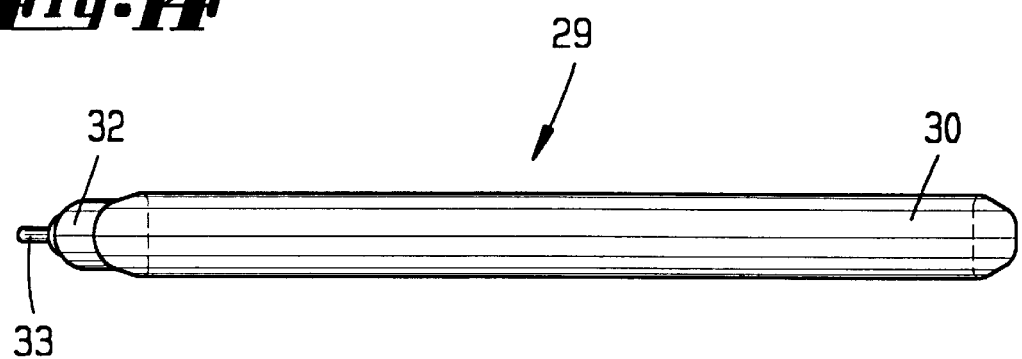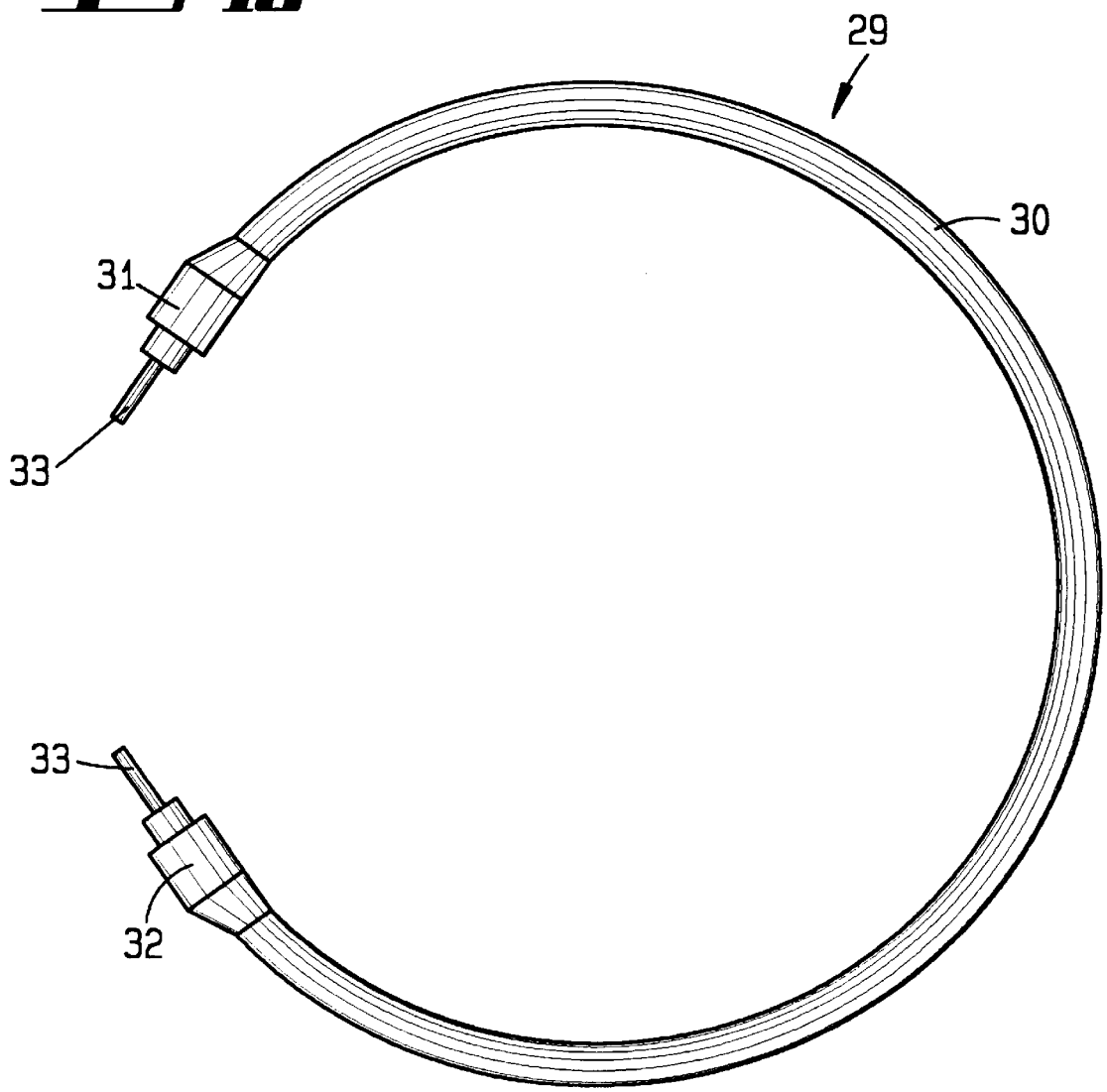

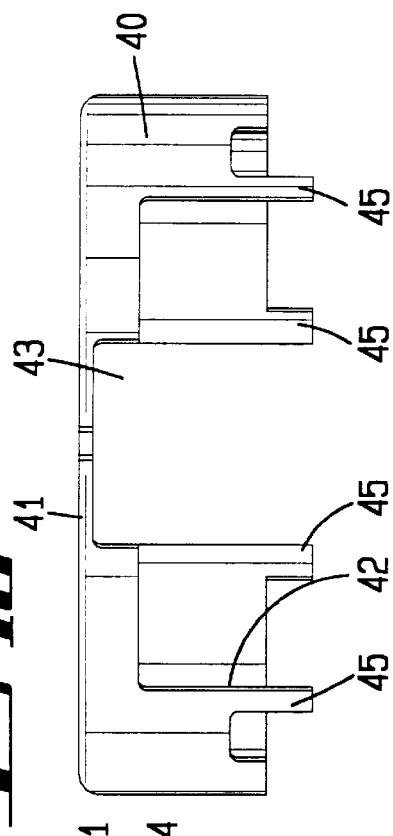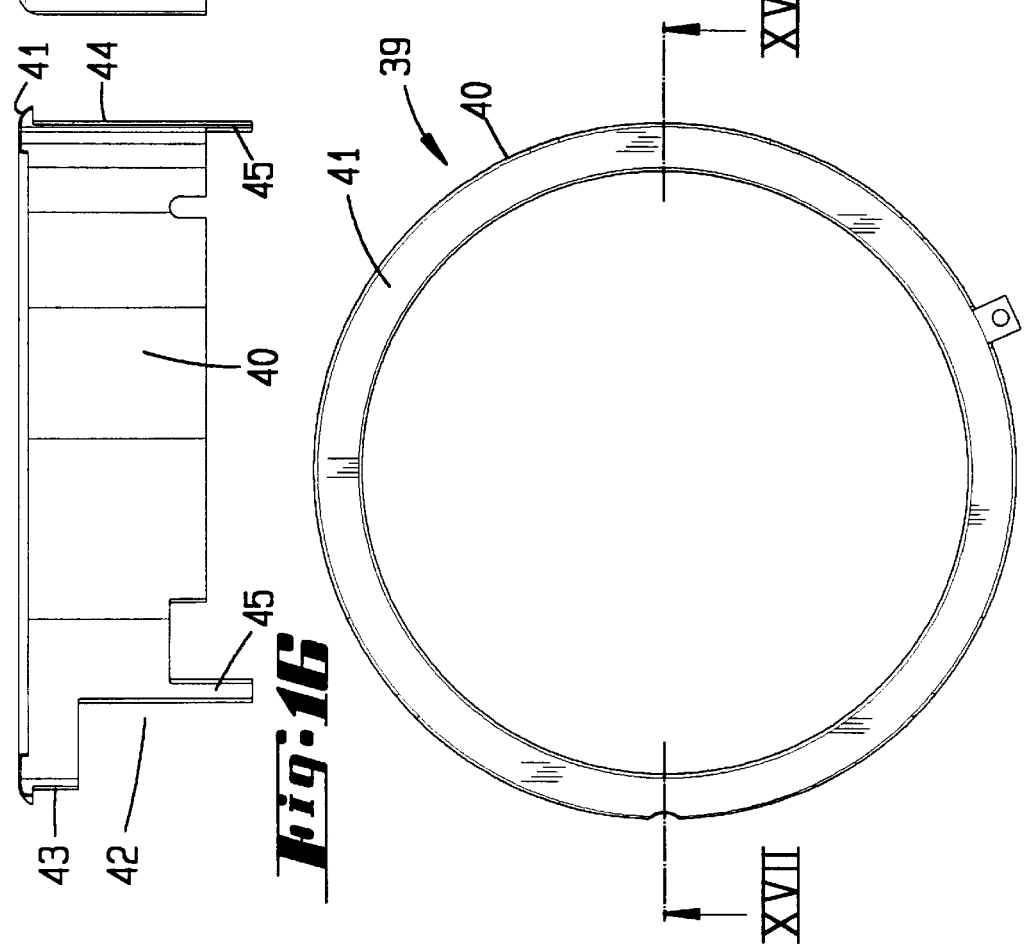

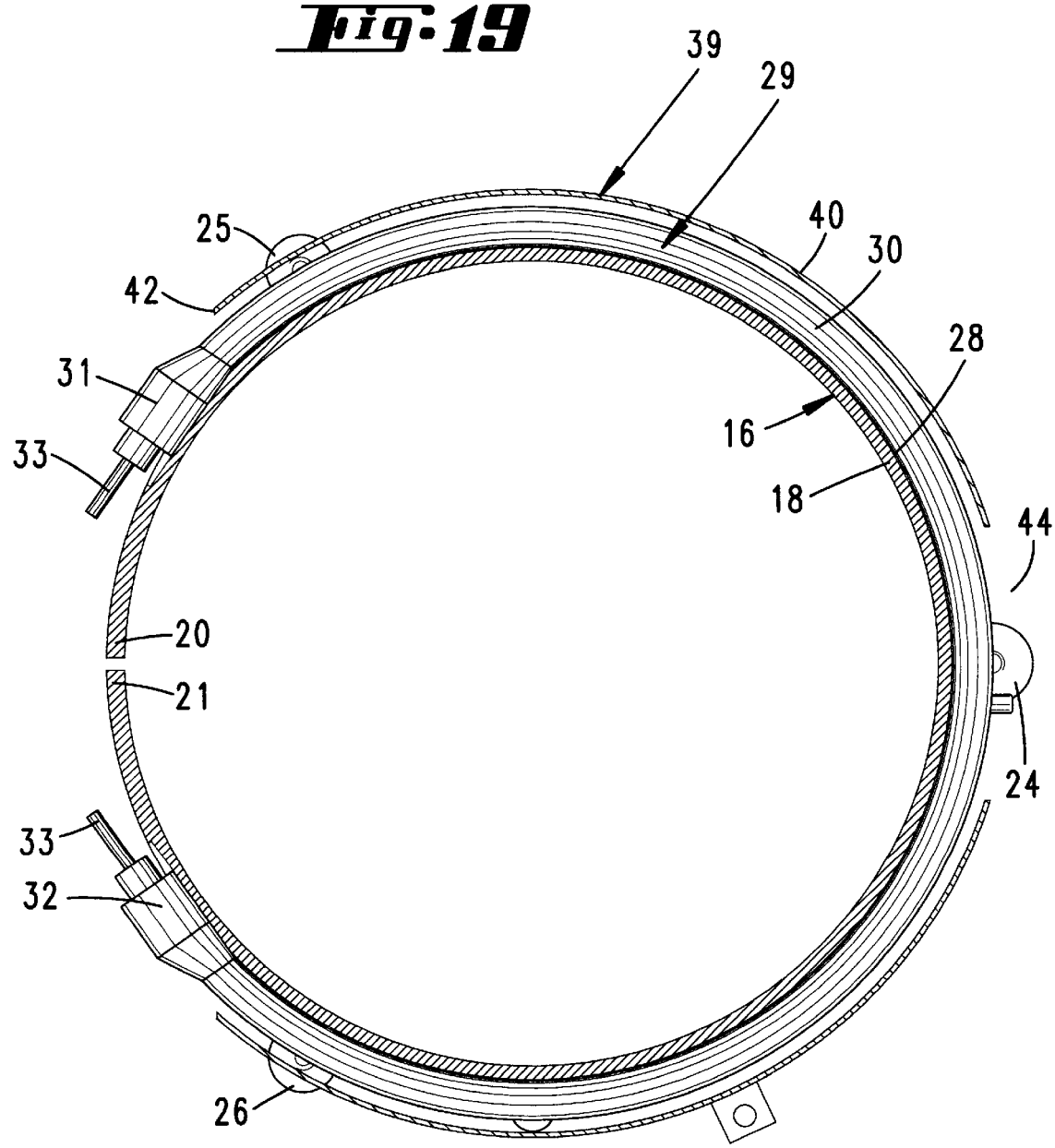

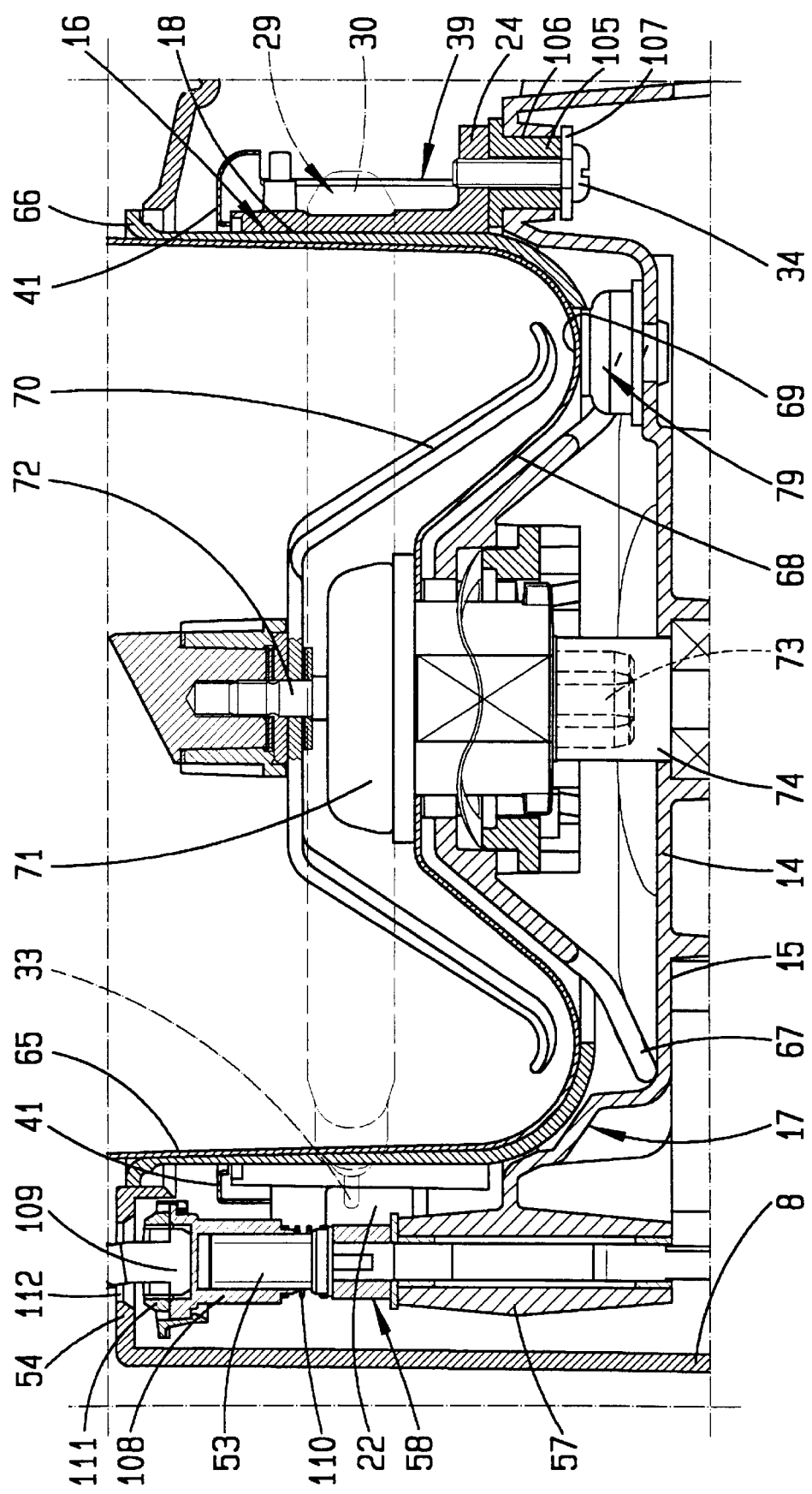

FOOD PROCESSOR COMPRISING A MIXING VESSEL AND A DRIVE MECHANISM FOR AN AGITATOR IN THE MIXING VESSEL

FIELD AND BACKGROUND OF THE INVENTION

The invention relates to a food processor comprising a mixing vessel and a drive mechanism for an agitator in the mixing vessel, wherein the mixing vessel may be heated in its lower region and may be held in a narrowly enclosing seat which has a substantially cylindrical wall region.

A food processor formed in such a manner is known from DE-OS 35 07 276. Here there is shown a mixing vessel, which is conically formed in its lower region in such a way that this region tapers downwardly. A mounting of the mixing vessel is effected in a seat in the device, which seat has a correspondingly conically-formed wall region. This seat is manufactured of aluminium and frictionally receives the mixing vessel manufactured of stainless steel sheet. Concentrically with the seat, there is provided on the underside of the seat a heating plate ring surface likewise comprised of aluminium. The seat transfers the heat absorbed by the heating plate ring surface via the surface exerting the frictional connection to the mixing vessel and therefore to the medium disposed in the mixing vessel. Further food processors are known in which the seat is PTFE-coated, to simplify a placement and release of pot and seat. It has proven that because of the different materials—mixing vessel of stainless steel and seat or heater of aluminium—at like temperature of heater/seat and mixing vessel, the heater/seat expands more than the mixing vessel and therefore an air gap may develop between the mixing vessel and the seat or the heater. By this, the frictional mounting is diminished, as a consequence of which there results an impaired heat transfer. In addition, it arises, in mixing vessels which have a vertical stop face, that this stop face loses the heat-conducting contact with the heater. But if the pot does not have a vertical stop face, there then results, after the heater is switched on, a sliding down of the mixing vessel deeper into the seat or heater. Consequently, there may result a jamming after cooling of the heater/seat and the mixing pot, because the heater or the seat shrinks to a greater extent than the mixing pot in its floor region. Even the cone, which converts a portion of the radial shrinkage forces into axial disengaging forces, and an optional PTFE-coating with low coefficient of friction, effect no upward movement of the mixing vessel. Furthermore, food residues or the like may get into the gap formed by the different thermal expansion coefficients of mixing vessel and heater/seat. These food residues or the like may lead, during the heating operation, in a permanent baking between the seat and the mixing vessel. After that, a removal of the mixing vessel may be effected only by relatively high exercise of force.

SUMMARY OF THE INVENTION

It is an object of the present invention to provide a food processor of this type improved so that there is always uniform heat transfer and a removal of the mixing vessel may be effected without great exercise of force after the food processor has been used.

As a result of such an arrangement, there is provided a food processor of this type in which there is always provided a uniform transmission of heat between the seat and the mixing vessel, irrespective of the level of the heating temperature. Furthermore, during operation, there is always provided a frictional retention. After use of the food processor, the frictional connection is relieved, by virtue of which the mixing vessel may be easily removed from the food processor. This is solved in that the cylindrical wall region may be changed with regard to its diameter, for frictional holding of the mixing vessel. To put the food processor into operation, the mixing vessel is seated in the processor, with the seat wall enclosing the lower region of the mixing vessel. After this, there is effected a change in the diameter of the cylindrical wall region of the seat, to the effect that there is achieved a reduction of the diameter for frictional clamping around the lower mixing-vessel region. The wall region and also the lower region of the mixing vessel may for this be conically formed as in the cited state of the art. By the variable diameter adaptation of the wall region, there may be effected a compensation for different thermal expansions of the materials. To remove the mixing vessel after a use, the diameter of the cylindrical wall region is enlarged in such a way that there may be effected an easy lifting off of the mixing vessel from the food processor. Because of this arrangement, the seat, while the food processor is operating, sits closely against the lower region of the mixing vessel. No radial air gap is produced, by virtue of which sufficient heat constantly reaches the mixing vessel and an accumulation of heat is counteracted. Should, after removal of the mixing vessel from the food processor, out of negligence, food or the like reach the cylindrical wall region of the seat and should there be effected after this a further operation of the food processor, then the burnt-on layer between the wall region and the mixing vessel is broken up by means of the forced opening provided by the enlargement of the diameter of the cylindrical seat to remove the mixing vessel. There is also provided, then, an easy removal of the mixing vessel from the food processor. It proves especially advantageous for the cylindrical wall region to be defined by an annular collar. Because of this arrangement, there is defined a relatively large heating surface, by which there are achieved lower energy densities on the mixing-vessel cover. In addition, there is effected by this formation, a centering of the mixing vessel in the seat. It is proposed to modify the seat to the effect that the collar is expandable to release the mixing vessel. After an operation of the food processor, to remove the mixing vessel, the diameter of the cylindrical wall region or the collar is enlarged by means of expansion. This is realized in a preferred embodiment in that the collar is substantially circular in plan view, but the circle is incomplete. To enable an easy expansion of a collar formed in such a way, it is further proposed to keep the profile of the collar cross-section very flat. The diameter change or the expandability of the collar is furthermore provided in that the collar is fixedly connected, at at least one bearing point, to a processor housing and is displaceable in an expansion direction at further bearing points. This may be solved, in a preferred embodiment, by the collar being fixedly connected, at the side opposite the open region (for example a slot), to a processor housing, for example in the form of a screw connection. In an alternative embodiment of the subject matter of the invention, it may furthermore be provided that the collar is fixedly connected, at two bearing points, to the processor housing, and is displaceable in an expansion direction at a further bearing point. In an arrangement of the collar as a body which is a substantially circular in plan view, it is preferred, in this connection, that the region lying opposite the open region is fixedly connected, as already mentioned, to the processor housing. Further, there is provided an additional fixing point, this in the region of a leg of the collar defining a toe. The expansion of the collar is effected, in this arrangement, only in the region of the collar toe lying opposite the fixed toe. The toe opposite the fixed toe is accordingly displaceably located on the processor housing, so that this free leg of the collar may subsequently execute the expansion movements. Because of this arrangement, when using a flexible drive coupling between the drive mechanism and the mixing vessel and its agitator, vibrations of mixing vessel and heater are reduced. The displaceability or expandability is provided by the collar being mounted, at the other bearing points, in elongated holes of a housing plate. For this purpose, the collar may have, for example, laterally located brackets, through which there pass bolts or the like. These bolts or the like engage, in turn, through elongated holes provided in the housing. These elongated holes are so arranged that the bolts or the like passing through them may subsequently execute the expansion of the collar. In order further to improve the aforementioned construction, it is provided that the expansion is executable between two projecting ends of the collar. On these projecting ends of the collar, there may engage a mechanism which effects a change in the diameter of the collar, i.e. an expansion or a compression of the collar. In this connection, it is preferred that the expansion be lever-actuatable. It proves especially advantageous for an expansion toggle to be provided, which acts between the two ends of the collar.

Because of this arrangement, relatively high leverage forces are achievable. Furthermore, by the use of an expansion toggle, there is achieved a uniform expansion of the collar. A slipping of the collar on a housing plate is thus counteracted. It is advantageously provided, in this connection, that the expansion toggle is displaceable about a vertical rotational axis. A rotation of the axis, for example through 90°, effects an associated rotation of the toggle, by which the collar is expanded. Preferred is an arrangement in which there is effected a rotation of the axis through 67°. A rotation of the expansion toggle out of this expanded position into a normal position effects a compression of the collar into a position defining the frictional seat. This may, for example, be by the collar comprising of a resiliently biassed material. It here proves especially advantageous for there to be provided, at the ends of the collar, outwardly-directed flanges which cooperate with the expansion toggle. At these outwardly-directed flanges provided on the side of the collar opposite to the cylindrical wall region, there may be provided, for example, vertically aligned pins which carry rotatable sleeves. The expansion toggle then acts upon these rotatable sleeves. The expansion toggle may also be provided with stop noses, so that there is achieved a defined expanded position. After reaching this position, a further rotation of the vertical rotational axis is not possible, because the stop noses abut against the rotatable sleeves or the flanges. Advantageously, it is provided that the expansion toggle is actuatable by means of a hand lever. By this means, the user is enabled, after insertion of the mixing vessel into the machine, to reduce the diameter of the collar or the seat and thereby produce a frictional connection between the collar and the lower region of the mixing vessel. In this connection, there also exists the possibility of not releasing the hand lever again until the machine is turned off, i.e. after putting the heater and an optionally switched-on agitator out of operation. Not until after that may the hand lever be turned back into its initial position, which effects an expansion of the collar. Preferred in this connection is an arrangement in which the hand lever is integrated into the mixing vessel. For this purpose, there is provided, between the mixing vessel and the machine, a coupling by means of which the displacements of the hand lever disposed in the mixing vessel are transferred to the rotational axis of the expansion toggle. The achievement of a frictional connection between collar and mixing vessel, i.e. the diameter reduction of the collar, is reinforced by the ends of the collar being biassed against one another by a spring. A rotation of the expansion toggle against the spring force effects an expansion of the collar. On a reverse rotation of the expansion toggle into the frictional position of the seat, the spring effects a compression of the collar, in which position there preferably remains an air gap of about 1.5 mm between the ends of the collar. Advantageously, the arrangement is chosen so that the spring engages against the flanges. It is further proposed here that the spring be formed to be U-shaped. Other springs are also usable here, such for example as compression springs acting in horizontal direction. However, as already mentioned, a U-shape-formed leaf spring is preferred. In further embodiment it may be provided that the biassing of the collar results, at least in part, from inner stresses of the collar. The collar accordingly has a predefinable biassing, which biassing acts in the direction of a closed position, i.e. a clamping position. Because of this, no further springs are needed to achieve the frictional position. The aforementioned biassing may be realised in that the collar has a preferably cast-in steel core. This steel core is cast in a stressed position into the collar, by virtue of which the latter has the desired bias. It may be provided here that the steel core which is to be cast in is a steel tube heating element. This steel tube heating element cast in under bias may at least partially apply the required biassing force. The heating of the lower region of the mixing vessel may be effected by means of a heater disposed underneath the seat. The heat emitted there is conducted via the seat and via the substantially cylindrically formed wall region of the collar to the mixing vessel. However, an arrangement is preferred in which there is provided a resistance heating element which engages against the outer side of the collar. This may, for example, be solved by mounting heating loops on the outer wall of the collar. The formation of a relatively thin-walled collar offers, in this connection, the advantage of an almost direct transfer of heat to the mixing vessel, the collar being able to compensate for any thermal expansions. Furthermore, the thin-walled embodiment of the collar serves also to keep the spring force low. This low spring force, in turn, is advantageous for the user, because by this means the actuating force to expand the collar is also kept low. Preferably, there is provided a resistance heating element which is a circular resistance heating wire. This resistance heating wire is, for example, mounted centrally on the outer wall of the collar, for example by means of soldering. For this purpose, the outer side of the collar may have a corresponding receiving groove. So that a resistance heating element arranged in such a manner may subsequently execute the expansion or the displaceability of the collar, it is finally provided that the resistance heating wire is formed in the shape of a circular segment, the free ends of the resistance heating wire being associated with the free ends of the collar. At these free ends of the resistance heating wire, there is effected the electrical connection. It here proves especially advantageous for a heating collar formed in this manner to be provided with a cover, which protects the adjoining components, in particular the housing of the food processor, from too great a heating effect. The low radiation losses towards the exterior result in an effective heating of the mixing vessel.

BRIEF DESCRIPTION OF THE INVENTION

With the above and other objects and advantages in view, the present invention will become more clearly understood in connection with the detailed description of preferred embodiments, when considered with the accompanying drawings, of which:

FIG. 1 shows a food processor in accordance with the invention, with a mixing vessel, in a side view, FIG. 2 shows the food processor according to FIG. 1 in front view, FIG. 3 shows a further representation of the food processor, but in plan view, FIG. 4 shows an enlarged representation of the region of the food processor accommodating the lower region of the mixing vessel, in cross section, relating to a first embodiment, FIG. 5 shows the section along the line V—V in FIG. 4, relating to the expanded position of a seating collar, with omission of the mixing vessel, FIG. 6 shows a detail enlargement from FIG. 5, relating to the region of an expansion toggle, FIG. 7 shows a partial representation in the region of the expansion toggle, viewed namely in the direction of the arrow VII in FIG. 5, FIG. 8 shows a representation corresponding to FIG. 5, but with unstressed, closed collar, likewise with omission of the mixing vessel, FIG. 9 shows a representation corresponding to FIG. 6, but relating to the position of the expansion toggle according to FIG. 8, FIG. 10 shows a representation corresponding to FIG. 7 and relating to the position according to FIG. 8, viewed in the direction of the arrow X in FIG. 8, FIG. 11 shows a detail representation of the collar in plan view, FIG. 12 shows the section along the line XII—XII in FIG. 11, FIG. 13 shows the collar in front view, FIG. 14 shows a resistance heating element in a side view, FIG. 15 shows the resistance heating element according to FIG. 14 in plan view, FIG. 16 shows a detail representation of a shielding cover in plan view, FIG. 17 shows the section along the line XVII—XVII in FIG. 16, FIG. 18 shows the front view of the shielding cover, FIG. 19 shows an assembly drawing of collar, resistance heating element and shielding cover in a horizontal cross-sectional representation, and FIG. 20 shows a representation corresponding to FIG. 4, but relating to a second embodiment.

DETAILED DESCRIPTION OF THE PREFERRED EMBODIMENTS

Figure 1:
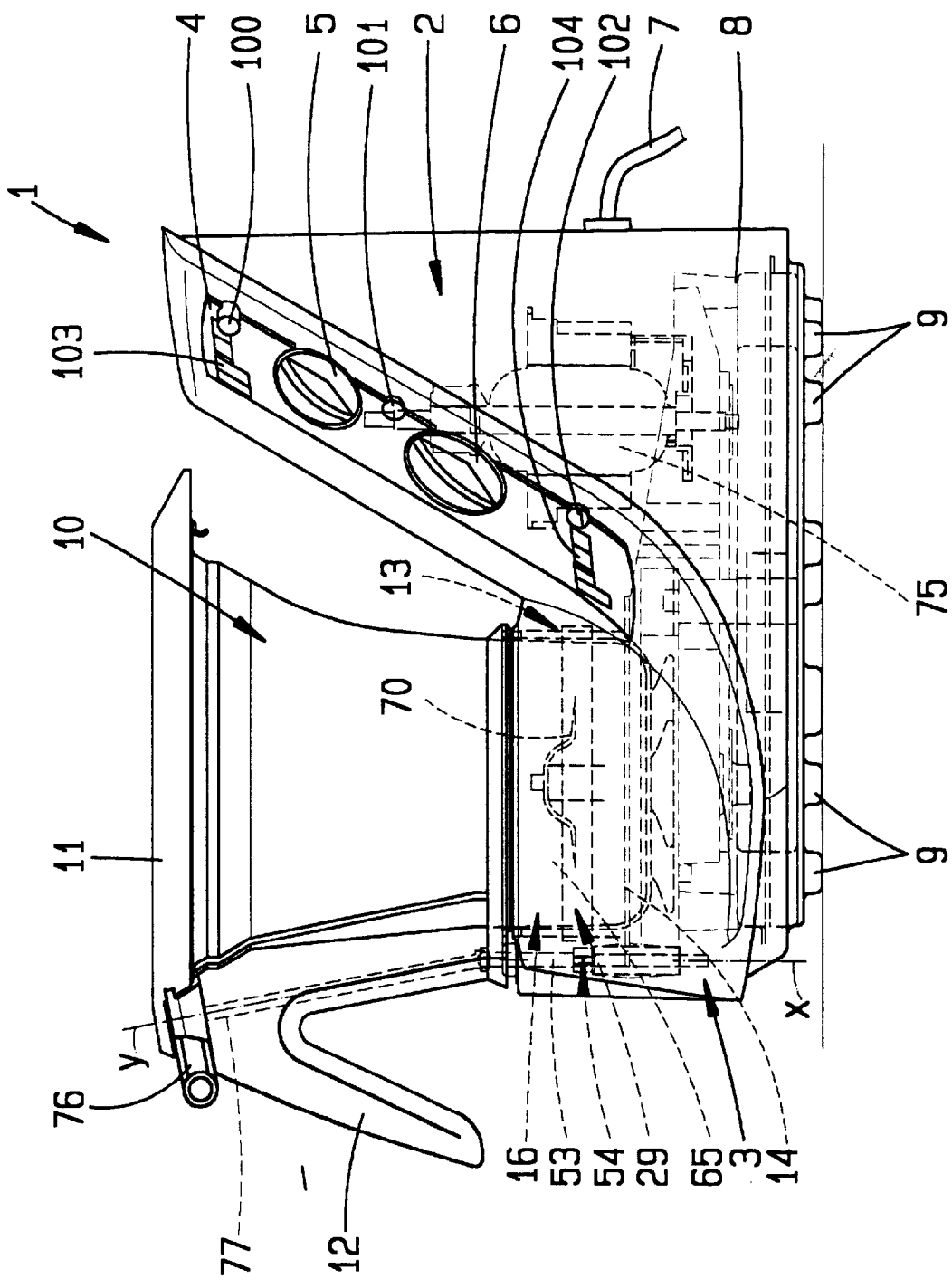
Figure 2:
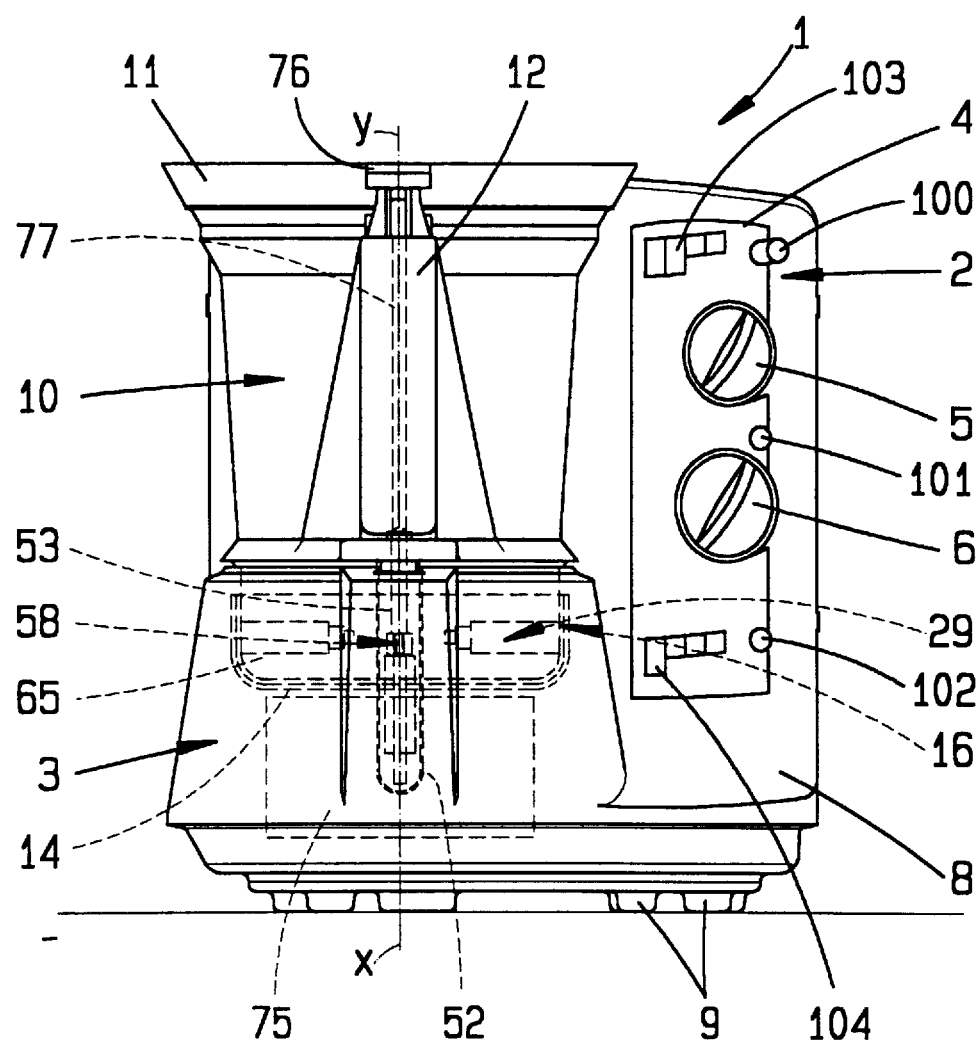
Figure 3:
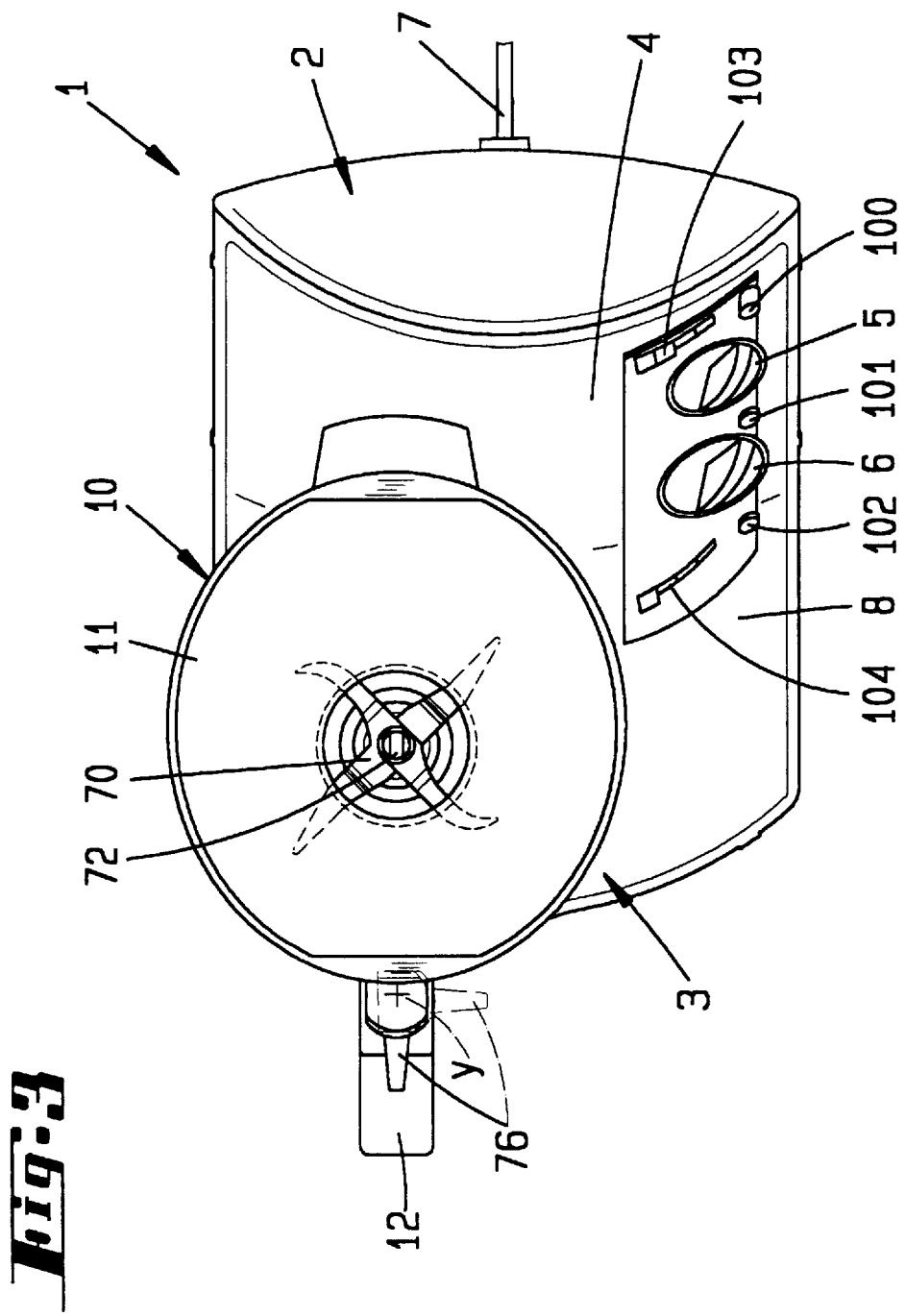

The food processor 1 shown in FIGS. 1 to 3 comprises substantially an operating/control region 2 and a seating/working region 3. The latter is pot-shaped and formed to be approximately circular in projection. Onto this region there is moulded the operating/control region 2, which has an operator panel 4 inclined upwardly at approximately 60°. In this operator panel 4, there are arranged three rotary switches 5, 6, 100 and two pushbutton switches 101 and 102. At the rear side of the operating/control region 2 of the food processor 1, there is provided an electrical cable connection 7. The housing 8 comprised of the two regions 2 and 3 furthermore has feet 9 on its underside.

The rotary switches provided in the operator panel 4 serve for temperature regulation of a resistance heating element 29 (rotary switch 5), for rotational speed control of an agitator 70 (rotary switch 6), and for adjustment of a time display 103 (rotary switch 100). By means of the pushbutton switch 101, there can be achieved for a short time a maximum rotational speed of the agitator 70. The pushbutton switch 102 serves as reset button for a weighing scales display 104.

In the seating/working region 3 there is mountable a can-form mixing vessel 10, whose upwardly-directed opening is closed by means of a removable cover 11. The mixing vessel 10 is, in addition, provided on its outer side with a handle 12.

To mount the mixing vessel 10, there is provided, in the seating/working region 3, a seat 13, which is comprised substantially of a housing plate 15 defining a seat base 14 and of a collar 16 arranged coaxially with the mixing vessel 10.

The housing plate 15 defining the seat base 14 is formed pot-shaped in the seat region, the seat base 15 being aligned coaxially with the vertical axis of the mixing vessel 10. Above this pot-shaped region 17, there is provided the collar 16, likewise arranged coaxially with the vertical axis of the mixing vessel 10.

The collar 16 defines a vertically aligned, substantially cylindrical wall region 18. The annular collar 16 is defined by the cylindrical wall region 18 and is substantially circular, but incompletely circular, in plan view. The profile of the wall region 18 is kept flat.

FIG. 11 shows a plan view of the collar 16. Here it is to be recognised that the annular collar 16 is provided with a slot 19 extending over the entire height of the collar 16. FIGS. 11 to 13 show the collar 16 in an unstressed position uninfluenced by outside forces.

At the projecting ends 20, 21 defined by the slot 19, there are provided flanges 22, 23 directly outwardly, i.e. provided on the outer wall of the collar 16 and directed away from the centre of the collar 16.

Furthermore, the collar 16 has brackets 24 to 26 provided at the lower edge of the wall region 18, likewise directed outwardly. These three brackets 24 to 26 are uniformly distributed about the outer wall of the wall region 18, an angle of 120° being enclosed between-each two brackets. The arrangement in this regard is such that one bracket 24 lies opposite the region of the projecting ends 20, 21 and the slot 19. The brackets 24 to 26 are each provided with threaded holes 27.

The collar 16 furthermore possesses, on its outer wall, a radial recess 28 which is arranged approximately centrally with respect to the height of the collar 16. The height of the recess 28 corresponds to about one-third of the height of the collar 16. The depth of the recess 28 amounts, in the embodiment shown, to about 0.5 mm, by virtue of which the wall region 18 is formed to be of reduced thickness in this region. The radial recess 28 encircles almost the entire circumference of the collar 16 up to the projecting end regions 20, 21, with a spacing from the slot 19.

In FIGS. 14 and 15, there is represented the already-mentioned resistance heating element 29 in the form of a resistance heating wire 30. The latter has an almost semi-circular cross section and is formed to be of circular segmental shape in plan view.

The inner diameter of the resistance heating wire 30 corresponds to the outer diameter of the collar 16 in the region of the radial recess 28.

Into this radial recess 28 of the collar 16, the resistance heating wire 30 is insertable, the latter, because of its circular-segment-shaped form, engaging around the collar 16. The free ends 31, 32 of the resistance heating wire 30 are in this way associated with the free ends 20, 21 of the collar 16.

For secure disposition of the resistance heating wire 30 on the collar 16 and to achieve a good heat transmission, the resistance heating wire may be soldered on or welded on.

The free ends 31, 31 of the resistance heating wire 30 are provided with electrical connections 33.

Figure 4:
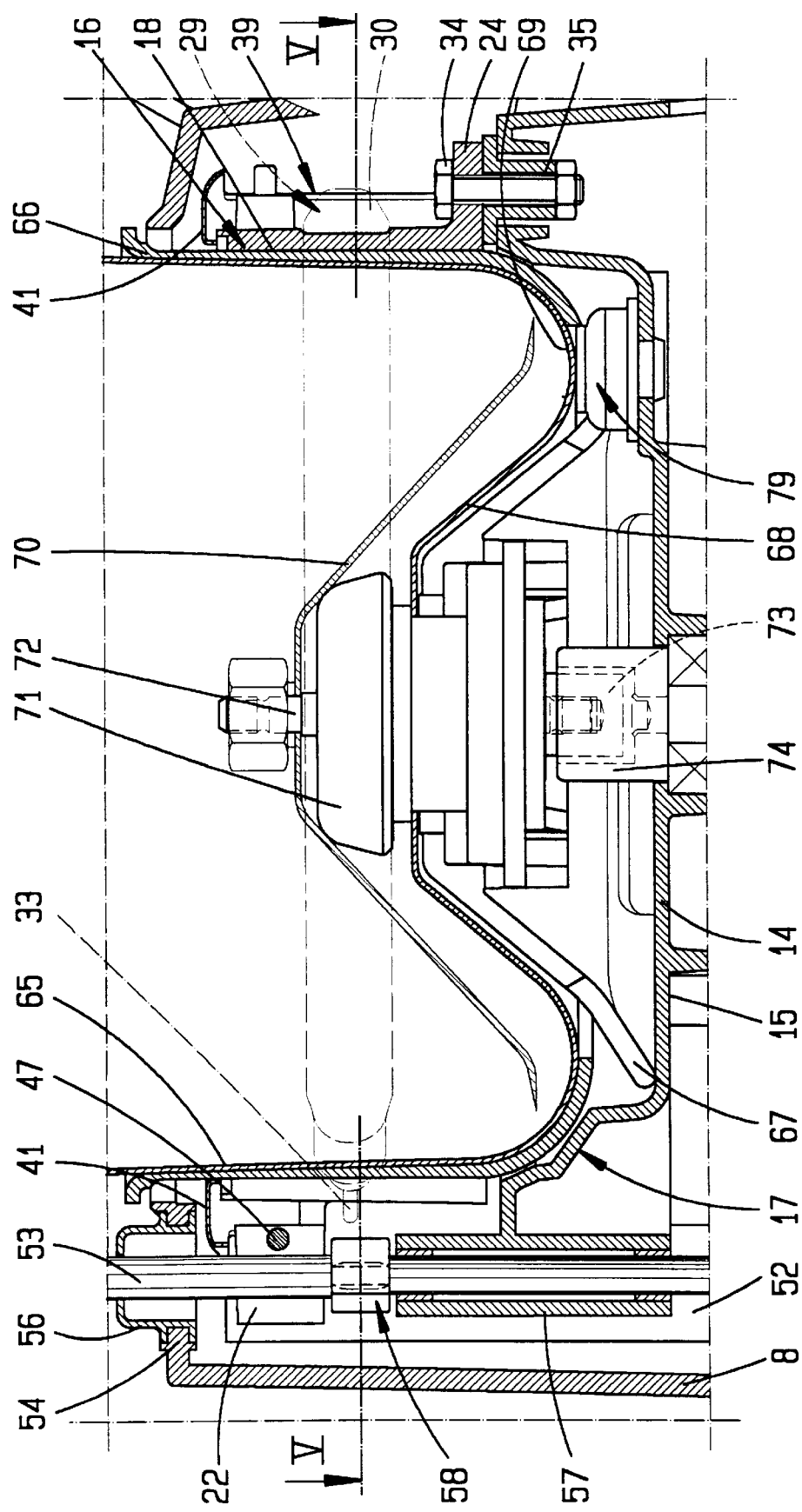

In FIG. 4, there is represented, in a first embodiment, the arrangement of the collar 16 in the housing 8. The collar 16 provided with the resistance heating wire 30 is fixed to the housing plate 15 outside the pot-shaped region 17. The bracket 24 of the collar 16 defines a fixed bearing point, in that a bolt 34 passes through the bracket 24 and a bore 35 of the housing plate 15 associated with the bracket and is fixed by a lock nut on the underside of the housing plate 15. The two other brackets 25 and 26 serve to define displaceable bearing points. For this purpose, there are associated with the brackets 25 and 26, elongated holes 36 and 37 in the housing plate 15. The vertical fixing of the collar 16 in these regions is effected by means of bolts 38, which pass through both the brackets 25 and 26 respectively and also the elongated holes 36 and 37 respectively and are fixed by lock nuts on the underside of the housing plate 15.

Alternatively, it may be provided that the collar 16, as well as the fixed bearing point in the region of the bracket 24, has a further fixed point. For this purpose, either the bracket 25 or the bracket 26 is likewise fixedly connected to the housing plate 15, the leg of the collar 16 having the other bracket, 26 or 25 respectively, being formed as displaceable toe. The cross sectional expansion or reduction is effected, accordingly, only in the region of one leg of the collar 16.

The collar 16 thus arranged and the resistance heating element 29 disposed on the outer side of the wall region 18 of the collar 16 are encircled radially on the outside by a shielding cover 39.

This shielding cover 39 is shown, in FIGS. 16 to 18, in a detail representation. It is to be recognised that the shielding cover 39 has a cover wall 40 which is circular in plan view, the height of which corresponds approximately to the collar 16. At the upwardly-projecting end of the cover wall 40, there is moulded an inwardly-projecting annular collar 41 which is dimensioned so that an opening 42 defined, by this arrangement, at the upper side of the shielding cover 39 has a diameter corresponding to the inner diameter of the collar 16. In the cover wall 40, there is provided a recess 42 open at the bottom edge, which has a width of about three-quarters of the diameter of the screening cover 39 and a height of about two-thirds of the height of the cover wall 40. Centrally of this recess 42, the latter is extended upwardly, i.e. in the direction of the annular collar 41, the width of this extension region 43 corresponding to about one-quarter of the total diameter of the screening cover 39. A recess 44 formed to correspond to this extension region 43 to be equal in size in regard to width is provided at the side of the cover wall 40 lying opposite the recess 42, this recess likewise being formed open at the bottom edge. The recess 44 and also the extension region 43 extend upwardly into the region of the annular collar 41, leaving a spacing from the latter.

The cover wall 40 has, in addition, four tongues 45 spaced equally apart from one another, which have a width of approximately 4 to 6 mm and a wall thickness equal to the wall thickness of the cover wall 40. The tongues 45 project beyond the lower edge region of the cover wall 40.

The shielding cover 39 covers to the greatest possible extent the collar 16 and the resistance heating element 29 disposed on the latter, the recess 42 and the extension region 43 of the cover wall 40 being associated with the free ends 20, 21 of the collar 16 and the free ends 31, 32 of the resistance heating wire 30. The tongues 45 of the shielding cover 39 penetrate through corresponding openings 46 of the housing plate 15. To secure the shielding cover 39, the tongues 45 are bent underneath the housing plate 15, by virtue of which there is avoided a vertical lifting off of the shielding cover 39.

The flanges 22 and 23 of the collar 16 are penetrated by a horizontally aligned pin 47, whose ends project at the side out of the flanges 22 and 23. At these ends, the pin 47 is secured in its axial direction.

Each flange 22 and 23 has, in addition, a control pin 48 and 49 respectively, vertically penetrating the flanges 22 and 23 respectively, each pin projecting downwardly beyond the underside of the respective flange 22 or 23. Onto these free ends of the control pins 48, 49, there are pushed rotatable sleeves 50, 51.

Furthermore, there is provided a U-shaped leaf spring 52, whose U-arms are directed upwardly. The free ends of the U-arms of the leaf spring 52 act from outside, laterally on the flanges 22, 23, by virtue of which these are resiliently biassed towards one another.

Between the two flanges 22 and 23, there enters an actuating rod 53 rotatable about a vertical axis x. The upper end of the actuating rod 53 projects above a housing cover 54 of the housing 8 and has, there, a horizontally aligned drive pin 55.

The housing cover is arranged directly above the shielding cover 39, a seal 56 being provided in the region where the actuating rod 53 passes through the housing cover 54.

The actuating rod 53 extends, after passing through the housing cover 54, into the lower region of the U-shaped leaf spring 52 and is rotatably mounted in a sleeve 57 moulded onto the housing plate 15.

At the level of the rotatable sleeves 50 and 51 of the flanges 22 and 23, the actuating rod 53 has an expansion toggle 28. Its outer surface defines control surfaces 59, 60, which pass into convex bearing surfaces 61, 62 lying opposite one another. In an edge region of each bearing surface 61 and 62 respectively, there is formed a stop nose 63 and 64 respectively.

The mixing vessel 10 already mentioned has, in its lower region 65, a double wall in the form of a pot rim 66 encircling the lower region 65. After introduction of the mixing vessel 10 into the seat 13, an adjusting foot 67 of the mixing vessel 10 abuts against the seat base 14. The adjusting foot 67 is arranged coaxially with the vertical axis of the mixing vessel 10 in an indented region 68 of the mixing vessel bottom 69.

Coaxially with the vertical axis of the mixing vessel 10, this is provided, in the region of the mixing vessel bottom 69, with the agitator 70, which is located, by means of a ball-bearing mounting 71, on the mixing vessel bottom 69. The agitator 70 is rotatably mounted on a shaft 72 in the mounting 71, the shaft 72 having, at its lower end penetrating the mixing vessel bottom 69, a coupling member 73. On insertion of mixing vessel 10 into the seat 13, this coupling member 73 engages in a correspondingly formed coupling receptor 74, by means of which the agitator 70 may be driven by an electric motor 75 and an interposed belt transmission. The rotational speed of the electric motor 75 and of the agitator 70 is adjustable by means of the rotary switch 6 in the housing 8.

In the transition region between the handle 12 and the cover 11 of the mixing vessel 10, a hand lever 76 is disposed to be pivotable with respect to the handle 12. Coaxially with the rotational axis y of the handle 12, there is provided, in the handle 12, a displacement rod 77 whose upper end is connected in a rotationally-fixed manner to the hand lever 76. The lower, free end of the displacement rod 77 is formed fork-shaped. After insertion of the mixing vessel 10 into the seat 13, this fork end 78 engages over the end of the actuating rod 53 which projects beyond the housing cover 54 and catches in this way the drive pin 55 disposed there. Accordingly, a thumb-actuated pivoting of the hand lever 76 effects an associated pivoting of the actuating rod 53.

It is preferred that, after insertion of the mixing vessel 10 into the seat 13, there is effected a pivoting of the hand lever 76 through 90° out of the position indicated in FIG. 3 by chain-dotted lines into the position shown in full outline. Correspondingly, the expansion toggle 58 also performs a rotation through 90°. In this position, the expansion toggle 58 has such a small diameter that the flanges 22 and 23, engaging by means of the sleeves 57 against the outer wall of the expansion toggle 58, move towards one another, because of the spring force of the leaf spring 52. Because of this, there is effected also a displacement of the free ends 20, 21 of the collar 16 into a position opposite one another according to FIG. 8, by which there is achieved a reduction of the diameter of the wall region 18 of the collar 16. In this position, there remains between the ends 20 and 21, an air gap of approximately 1.5 mm. Accordingly, there also remain, because of the abutment of the collar 16 at the lower region 65, air gaps of approximately 0.75 mm between the rotatable sleeves 50 and 51 and the expansion toggle 58. The lower region 65 of the mixing vessel 10 is therefore held by friction. After this, there may be effected a switching on of the resistance heating element 29, control of the heat output being effected by means of the rotary switch 5 in the housing 8.

Because of this arrangement, different thermal expansions of mixing vessel 10 and collar 16 in the heating operation are compensated by the spring biassing. The collar 16 sits closely against the lower region 65 of the mixing vessel 10 in such a way that no radial air gap exists and therefore sufficient heat reaches the mixing vessel 10, without its being possible for an accumulation of heat to develop in the collar 16.

To release the frictional holding of the mixing vessel 10 in the seat 13, the hand lever 76 is pivoted back through 90 degrees into the position indicated in FIG. 3 in chain-dotted outline. This causes a simultaneous rotation of the expansion toggle 58, likewise through 90 degrees, by virtue of which the rotatable sleeves 50 and 51 engaging against this expansion toggle push outwards radially with respect to the rotational axis x of the expansion toggle 58. As is to be seen from FIG. 6, in this expanded position, the rotatable sleeves 50 and 51 lie in the convex bearing surfaces 61, 62 of the expansion toggle 58. There is therefore produced a defined expanded position, which can only be departed from by deliberate action. The rotation of the expansion toggle 58 at the same time effects an expansion of the collar 16, by virtue of which the diameter of the wall region 18 of the collar 16 is again enlarged. After this, there is enabled an easy removal of the mixing vessel 10.

The vertical fixing of the collar 16 in the elongated holes 36 and 37 enables this expansion.

Because of the aforementioned arrangement, there is produced a forced opening to remove the mixing vessel 10.

Should, out of negligence, food residues deposit upon the inner wall of the collar 16 and should they, during the heating operation, effect a baking of collar 16 and mixing vessel 10, then on an opening or an expansion of the collar 16, the burnt-on layer is broken up, after which the mixing vessel 10 may be removed without exercise of force.

To monitor the instantaneously prevailing temperature in the mixing vessel 10, there is provided a heat sensor 79, which is disposed in the seat base 14 and engages against the underside of the mixing vessel bottom 69.

In FIG. 20, there is shown a second embodiment of the arrangement of the collar 16 in the housing 8. Here there is shown in particular an alternative possibility for fixing the collar 16 to the housing plate 15.

In the section represented, there is shown the fixed bearing point lying opposite the projecting ends 20, 21 of the collar 16. The bracket 24 disposed there has, as in the first embodiment, a bore provided with a thread. Between the bracket 24 and the housing plate 15, there is interposed an insulating bush 105 for heat insulation. An annular collar of this insulating bush engages against the housing plate 15 and a cylindrically formed region of the bush enters into a correspondingly formed opening 106 of the housing plate 15. This opening 106 is formed, at the fixed bearing point in the region of the bracket 24, as a circular aperture. In the region of the displaceable brackets 25 and 26, there are formed corresponding elongated holes as openings 106.

The fixing of the bracket 24 to the housing plate 15 is effected by means of a bolt 34, which passes from an underside of the housing plate 15, through the insulating bush 105, into the thread of the bracket 24. Between bolt head and insulating bush 105, there is provided a plain washer 107, which has play in vertical direction relative to the housing plate 15. This plain washer 107 defines the vertical stop for the collar 16. The fastenings for the brackets 25 and 26 are formed to correspond to this fastening.

For rotatable actuation of the actuating rod 53, this actuating rod has on its head side, i.e. facing the housing cover 54, a coupling receptor 108, into which there enters positively a hammer-head like coupling extension 109 of the mixing vessel 10. The coupling extension is rotatable by means of the hand lever 76 of the mixing vessel 10, a pivoting of the hand lever 76 through 67° being effected in order to expand the collar 16.

The coupling receptor 108 is displaceable in vertical direction on the actuating rod 53, a compression spring 110 biassing the coupling receptor 108 constantly in the direction of the housing cover 54. At the top side, the coupling receptor 108 has a sealing cap 111, which has a contour formed to correspond to a housing cover opening 112. After removal of the mixing vessel 10, the coupling receptor 108 displaces upwardly in the direction of the housing cover 54, the cap 111 engaging sealingly in the region of the cover opening 112. A mounting of the mixing vessel 10 effects a downward displacement of the coupling receptor 108 into the position represented in FIG. 20.

The sealing cap 111 has a through opening for the coupling extension 109, which is formed to correspond to the hammer-head like configuration of the extension 109. When the coupling receptor 108 is locked, the hammer-head like coupling extension 109 then enters under the sealing cap 111, after a corresponding pivoting through, for example, 67°. Use is made here of the principle of the keyhole. After this, the mixing vessel 10 cannot be pulled off the food processor 1, even by force. It is therefore assured that even in the event of a conscious maloperation, the food processor 1 cannot be operated without the mixing vessel 10.

By the special shaping of the sealing cap 111, the user is compelled to rotate the coupling extension 109 completely into its end position and thereby rotate the expansion toggle 58 into its lock-in position, in order to remove the mixing vessel 10 from the food processor 1. Without this special form of the keyhole, the collar 16 of the heater could be expanded by a partial rotation of the expansion toggle 58 and the mixing vessel 10 could be pulled out. The hammer-head like coupling extension 109 would come out of engagement with the coupling receptor 108, whereby, because of the spring biassing, the collar 16 of the heater would snap shut again. The collar 16 of the heater would therefore not be expandable again by the user.

What is claimed is:

1. A food processor comprising:
    an agitator, a mixing vessel for receiving the agitator, and a drive mechanism for the agitator; a seat narrowly enclosing said vessel upon insertion of the vessel in the seat;
    wherein the mixing vessel is to be heated in a lower region;
    the seat has a substantially cylindrical wall region having a diameter which is variable in size to enable a frictional holding of the mixing vessel by the seat.

2. A food processor comprising:
    an agitator, a mixing vessel for receiving the agitator, and a drive mechanism for the agitator;
    a seat narrowly enclosing said vessel upon insertion of the vessel in the seat;
    wherein the mixing vessel is to be heated in a lower region;
    the seat has a substantially cylindrical wall region having a diameter which is variable in size to enable a frictional holding of the mixing vessel by the seat; and
    the cylindrical wall region is defined by an annular collar.

3. A food processor according to claim 2, wherein the collar is expandable for release of the mixing vessel.

4. A food processor according to claim 2, wherein the collar is substantially circular in plan view, the collar having a gap therein for partial encirclement of the vessel.

5. A food processor according to claim 2, further comprising a processor housing and plural bearing points;
    wherein the collar is fixedly connected, at at least one of the bearing points to the processor housing, and is displaceable in an expansion direction at a further one of the bearing points.

6. A food processor according to claim 5, wherein the collar is fixedly connected, at two of the bearing points, to the processor housing, and is displaceable in an expansion direction at a further ones of the bearing points.

7. A food processor according to claim 6, wherein the housing includes a plate, and the collar is mounted, at the outer bearing points, in elongated holes of the housing plate.

8. A food processor according to claim 3, wherein the expansion is executable between two projecting ends of the collar.

9. A food processor according to claim 3, wherein the expansion is lever-actuatable.

10. A food processor according to claim 8, further comprising an expansion toggle which acts between two ends of the collar.

11. A food processor according to claim 10, wherein the expansion toggle is displaceable about a vertical rotational axis parallel to an axis of the seat.

12. A food processor according to claim 10, further comprising, at the ends of the collar, outwardly-directed flanges which cooperate with the expansion toggle.

13. A food processor according to claim 10, further comprising a hand lever, and wherein the expansion toggle is actuatable by means of the hand lever.

14. A food processor according to claim 13, wherein the hand lever is integrated into the mixing vessel.

15. A food processor according to claim 8, further comprising a spring wherein the ends of the collar are biassed against one another by the spring.

16. A food processor according to claim 15, further comprising flanges disposed at ends of the collar, wherein the spring engages against the flanges.

17. A food processor according to claim 15, wherein the spring is formed in the shape of a U.

18. A food processor according to claim 2, wherein a biassing of the collar results, at least in part, from internal stresses of the collar.

19. A food processor according to claim 2, wherein the collar has a cast-in steel core.

20. A food processor according to claim 2, further comprising a resistance heating element which engages against an outer side of the collar.

21. A food processor according to claim 20, wherein the resistance heating element comprises a circular resistance heating wire.

22. A food processor according to claim 21, wherein the resistance heating wire is formed in the shape of a circular segment, and free ends of the resistance heating wire are associated with free ends of the collar.

23. A food processor comprising:
    an agitator, a mixing vessel for receiving the agitator, and a drive mechanism;
    a seat narrowly enclosing said vessel upon insertion of the vessel in the seat;
    wherein the mixing vessel is to be heated in a lower region;
    the seat has a substantially cylindrical wall region with a gap providing for partial encirclement of the vessel enabling adjustment of a diameter of the cylindrical wall region to grip the vessel.

24. A food processor comprising:
    an agitator, a mixing vessel for receiving the agitator, and a drive mechanism;
    a seat narrowly enclosing said vessel upon insertion of the vessel in the seat;
    wherein the mixing vessel is to be heated in a lower region;
    the seat has a substantially cylindrical wall region and means for adjusting a diameter of the cylindrical wall region to grip the vessel.

* * * * *